United States Patent
Trinkel

(10) Patent No.: US 7,221,743 B2
(45) Date of Patent: May 22, 2007

(54) RESETTING SENT INFORMATION

(75) Inventor: Marian Trinkel, Kreuzau-Untermaubach (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/494,095

(22) PCT Filed: Oct. 8, 2002

(86) PCT No.: PCT/DE02/03800

§ 371 (c)(1),
(2), (4) Date: Apr. 30, 2004

(87) PCT Pub. No.: WO03/041434

PCT Pub. Date: May 15, 2003

(65) Prior Publication Data

US 2005/0008128 A1   Jan. 13, 2005

(30) Foreign Application Priority Data

Nov. 2, 2001 (DE) .................... 101 54 053

(51) Int. Cl.
*H04M 1/64* (2006.01)
(52) U.S. Cl. ................ 379/88.23; 379/88.21
(58) Field of Classification Search ............ 379/88.21, 379/88.23, 142.06, 88.19, 88.01, 88.02
See application file for complete search history.

(56) References Cited

U.S. PATENT DOCUMENTS

| 5,022,070 A | 6/1991 | Forson et al. ............ 379/32 |
| 5,461,665 A | 10/1995 | Shur et al. ............ 379/67 |
| 5,481,597 A * | 1/1996 | Given ............ 379/88.23 |
| 5,926,526 A | 7/1999 | Rapaport et al. ....... 379/88.25 |
| 5,966,351 A | 10/1999 | Carleton et al. ........... 369/29 |
| 6,219,542 B1 | 4/2001 | Aas et al. ................ 455/422 |
| 6,327,343 B1 * | 12/2001 | Epstein et al. ........... 379/88.01 |
| 6,625,260 B1 * | 9/2003 | Brockman et al. ....... 379/88.21 |
| 6,999,566 B1 * | 2/2006 | Eason et al. ............ 379/88.22 |
| 2004/0042595 A1 * | 3/2004 | Davis et al. ............ 379/88.22 |

FOREIGN PATENT DOCUMENTS

| DE | 4444871 | 6/1996 |
| DE | 19505209 | 8/1996 |
| EP | 0810764 | 12/1997 |
| EP | 0820182 | 1/1998 |
| EP | 0989715 | 3/2000 |
| WO | 9931863 | 6/1999 |

OTHER PUBLICATIONS

"Mehr Telefon-Komfort im C-Netz", Heinz Reuschenbach, Funkschau Jan. 11, 1991, No. 2, Munich, Germany (see International Search Report).

* cited by examiner

*Primary Examiner*—Ovidio Escalante
(74) *Attorney, Agent, or Firm*—Darby & Darby

(57) ABSTRACT

A method for operating a message memory connected to a telecommunications network includes assigning a message memory to a subscriber line of an addressee, the subscriber line being selectable using an individual network indicator. Using the message memory, a message left by a sender for the addressee is stored so that the message is retrievable by the addressee. After an authenticating by the sender; the content of the stored message is changed by the sender.

10 Claims, 1 Drawing Sheet

RESETTING SENT INFORMATION

The present invention relates to a method for operating a message memory (mobile box), which is connected to a telecommunications network, especially a telephone network, and which is assigned to a subscriber line of an addressee that can be selected using an individual network indicator, and on which a sender can leave a message that is intended for and can be retrieved by the addressee.

BACKGROUND

As is generally known, such methods are implemented by means of answering machines or by mobile boxes, which, when called, respond to a caller instead of the addressee, and which, after a recorded announcement, allow the caller to leave a message on the tape which can then be played back at any time by the addressee who the message is intended for. These systems, which are hereinafter referred to as "mobile boxes" are used not only to record voice messages, but also to record facsimiles in which the sender can leave a fax message for later retrieval. Comparable methods are implemented in the Internet, where the sender can leave e-mails for selected addressees in a specific memory area, the e-mails being retrieved by the addressee at a later time. In this context, it is also known to retrieve the stored messages from external devices such as telephone connections. Thus, the user, while away, can use the telephone to access all messages, play back received voice messages, or forward fax messages or e-mails to an arbitrary device, from where they can then be printed. In this context, the so-called "SMS messages" (short message service) are regarded as equal to e-mails.

However, the known methods have the disadvantage that the recorded voice messages sometimes have become outdated at the time they are retrieved or played back. For example, it is conceivable that a person A leaves a voice message in the mailbox of another person B indicating that he/she arrives at the train station at a certain time and would like to be picked up. Later, however, it turns out that there is a another travel option, and person A leaves another voice message on the tape, the content of which replaces the first message. However, person B plays back only the first message and immediately rushes to the train station because there is not much time left. It is only when person B returns home disappointed that he/she gets the second message which replaces the content of the first message. With the methods known today, such communication problems can occur at any time.

SUMMARY OF THE INVENTION

It is an object of the present invention to provide a method which can be implemented by simple and inexpensive means, and which allows updating of previously left messages. Another object of the present invention is to provide a device for implementing the method.

The present invention provides a method for operating a message memory connected to a telecommunications network. The method includes: assigning a message memory to a subscriber line of an addressee, the subscriber line being selectable using an individual network indicator; storing, using the message memory, a message left by a sender for the addressee so as to enable the message to be retrieved by the addressee; authenticating by the sender; and changing a content of the stored message by the sender after the authenticating.

The present invention also provides a device for storing incoming messages. The device includes a message memory configured to store a message left by a sender for an addressee so as to enable the message to be retrieved by the addressee; and a correction module configured to enable the sender to at least one of change and delete the stored message after an authenticating of the sender.

According to the present invention the sender of a message is provided with the ability to change or possibly delete the previously left message at a later time. Advantageously, erroneous or outdated messages can be edited afterwards to preclude misunderstandings of the indicated type. Thus, in the case of voice or fax mailboxes which implement this method, it is possible to retract previously sent messages. In this context, according to the present invention a sender who wishes to edit a message first authenticates himself/herself in order to preclude misuse. Thus, the present invention manifests itself in the ability for the sender to later change the content of a stored message after he/she has authenticated.

According to the present invention, unlike the known systems, in which only the addressee is able to play back or delete the messages, now anyone can do this provided he/she is assigned an authorization. Using the new method, telecommunications network carriers can offer a new, customer-friendly service which is an attractive feature for existing products. Moreover, the present invention allows the implementation of new business models.

Since the sender is in control of the data, he/she is able to cancel messages, such as incorrect information, sent by mistake. Such a feature is valuable especially in Asian culture groups to allow the caller to save face. The inventive concept can be used everywhere where information is sent and, in particular, centrally stored. A network provider who implements a method of this type will have a new chance in competition. The method does not need to be organized centrally, but can also be implemented by terminal devices which are connected to a customer's network access point in the same way as the known answering machines.

BRIEF DESCRIPTION OF THE DRAWING

The present invention is elaborated upon below based on an exemplary embodiment with reference to the drawing, in which.

DETAILED DESCRIPTION

Figure 1:
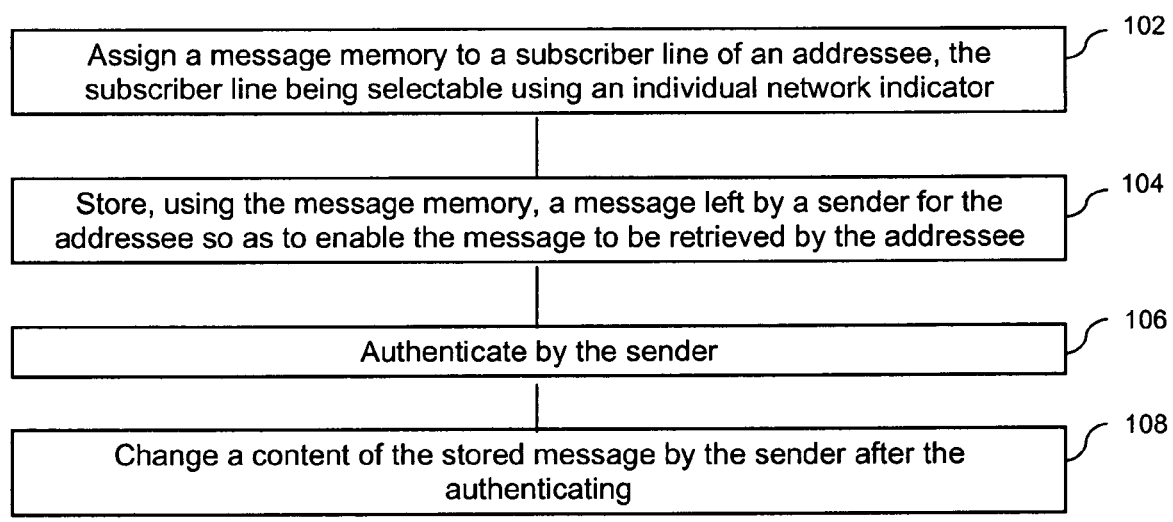
FIG. 1 shows a flowchart of a method for operating a message memory.

Referring to FIG. 1, in a method for operating a message memory, a message memory is assigned to a subscriber line of an addressee, the subscriber line being selectable using an individual network indicator (see block 102). Using the message memory, a message left by a sender for the addressee is stored so as to enable the message to be retrieved by the addressee (see block 104). An authentication is performed by the sender (see block 106). After the authentication, a content of the stored message is changed by the sender (see block 108).

Depending on the field of application, different methods can be used for sender authentication. In a particularly simple and therefore advantageous embodiment, the network indicator of the sender is stored along with the message. If the sender of the same network indicator calls again, then he/she is automatically associated with the originally stored message and given the possibility of editing this message. Thus, the system analyzes the line identifier and identifies the sender by this identifier. In another embodiment of the method, the sender is identified by the content of a keyword spoken by him/her which is stored in connection with the previously left message. Thus, for example, it is possible for the sender who calls again to be associated with his/her message in which he/she requested to be met at the train station by the term "train station". If the keyword matches, the sender is given access to the message. The keywords used are, in particular, the words spoken in the initially stored message.

Besides the content of the message, it is also possible to use speech-specific characteristics for authentication. Thus, it is possible to carry out a comparison of voices, for which it is sufficient that the sender who calls again speaks a few words to the mobile box, and that a program implemented for this purpose carries out a comparison with the spoken messages on the basis of the voice timbre and sound. This comparison of the voice characteristics can also be used in addition to the aforementioned authentication method using keywords. In this context, voice comparison is done, in particular, by a voice analysis program provided by the network provider. The known programs are able to analyze a person by the individual voice characteristics such as the tone, the timbre, or the length of speech pauses or micro-pauses.

If the addressee sender who calls again has authenticated, it is advantageous for the mobile box to allow him/her to navigate to his/her first recorded voice message, via an, in particular, voice-driven menu system, and to then enable him/her to play back, rerecord and/or delete this message. Within these bounds, the sender is in control of his/her previously spoken information. In this context, it is particularly advantageous if a message left in the mailbox is automatically marked once it has been retrieved by the addressee. This mark is detected by the sender who calls again so that the sender is informed that his/her "misleading" message has already arrived, and that an additional message may worsen the confusion.

The method according to the present invention is advantageously implemented by a device having a correction module which allows a sender to change and/or a delete a previously stored message after he/she has authenticated. In an advantageous embodiment, such a correction module is implemented by a program which is executed on a computer connected to the network.

What is claimed is:

1. A method for operating a message memory connected to a telecommunications network, the method comprising:
   assigning a message memory to a subscriber line of an addressee, the subscriber line being selectable using an individual network indicator;
   storing, using the message memory, a message left by a sender for the addressee so as to enable the message to be retrieved by the addressee;
   storing a keyword in association with the message, the keyword including a word in the message;
   authenticating using the keyword spoken by the sender in a subsequent call; and
   changing a content of the stored message by the sender after the authenticating.

2. The method as recited in claim 1 wherein the telecommunications network includes a telephone network.

3. The method as recited in claim 1 further comprising storing, in association with the message, a network identifier assigned to the sender, and wherein the authenticating is performed using the network identifier.

4. The method as recited in claim 1 wherein:
   the message is a spoken message; and
   the authenticating includes comparing a voice of the sender to a voice of the spoken message using a voice analysis program provided by a provider of the telecommunications network.

5. The method as recited in claim 1 wherein the message is a voice message, and further comprising navigating, by the sender, to the voice message after the authenticating so as to enable the sender to at least one of play back, rerecord and delete the voice message.

6. The method as recited in claim 1 further comprising:
   retrieving the stored message by the addressee; and
   then automatically marking the stored message.

7. A device for storing incoming messages, comprising:
   a message memory configured to store a message left by a sender for an addressee so as to enable the message to be retrieved by the addressee, and configured to store a keyword in association with the message, the keyword including a word in the message; and
   a correction module configured to enable the sender to at least one of change and delete the stored message after an authenticating by the sender, wherein the authenticating is performed using the keyword spoken by the sender in a subsequent call.

8. The device as recited in claim 7 wherein the correction module includes a computer connected to a telecommunications network, the computer executing a program configured to effect capabilities of the correction module.

9. The device as recited in claim 8 wherein the telecommunications network is a telephone network.

10. A computer readable medium having stored thereon computer executable process steps operative to perform a method for operating a message memory connected to a telecommunications network, the message memory having a message stored thereon by a sender and having a keyword stored thereon in association with the message, the keyword including a word in the message, the method comprising authenticating using the keyword spoken by the sender in a subsequent call, and then changing or deleting the stored message using a correction module.

* * * * *